(12) United States Patent
Hakura et al.

(10) Patent No.: US 9,411,596 B2
(45) Date of Patent: Aug. 9, 2016

(54) TILED CACHE INVALIDATION

(71) Applicant: NVIDIA Corporation, Santa Clara, CA (US)

(72) Inventors: Ziyad S. Hakura, Gilroy, CA (US); Emmett M. Kilgariff, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 78 days.

(21) Appl. No.: 14/016,847

(22) Filed: Sep. 3, 2013

(65) Prior Publication Data

US 2014/0122812 A1    May 1, 2014

Related U.S. Application Data

(60) Provisional application No. 61/719,271, filed on Oct. 26, 2012.

(51) Int. Cl.
*G06F 12/00* (2006.01)
*G06F 9/38* (2006.01)
*G06T 15/00* (2011.01)
(Continued)

(52) U.S. Cl.
CPC .. *G06F 9/38* (2013.01); *G06F 9/44* (2013.01); *G06F 12/0808* (2013.01); *G06F 12/0875* (2013.01); *G06T 1/20* (2013.01); *G06T 1/60* (2013.01); *G06T 15/005* (2013.01); *G06T 15/405* (2013.01); *G06T 15/503* (2013.01); *G06T 15/80* (2013.01); *G09G 5/003* (2013.01); *G09G 5/395* (2013.01); *G06F 2212/302* (2013.01); *Y02B 60/1225* (2013.01)

(58) Field of Classification Search
CPC ............ G06F 12/0808; G06F 12/0875; G06F 2212/302; G06F 9/38; G06F 9/44; G06T 15/005; G06T 15/405; G06T 1/20; G06T 1/60; G06T 15/503; G06T 15/80
USPC ....................................................... 711/144
See application file for complete search history.

(56) References Cited

U.S. PATENT DOCUMENTS 6,323,860 B1    11/2001    Zhu et al.
6,535,209 B1    3/2003    Abdalla et al.
(Continued)

OTHER PUBLICATIONS

Non-Final Office Action for U.S. Appl. No. 14/045,361 dated Feb. 26, 2016.

*Primary Examiner* — Matthew Bradley
(74) *Attorney, Agent, or Firm* — Artegis Law Group, LLP

(57) ABSTRACT

One embodiment of the present invention sets forth a graphics subsystem. The graphics subsystem includes a first tiling unit associated with a first set of raster tiles and a crossbar unit. The crossbar unit is configured to transmit a first set of primitives to the first tiling unit and to transmit a first cache invalidate command to the first tiling unit. The first tiling unit is configured to determine that a second bounding box associated with primitives included in the first set of primitives overlaps a first cache tile and that the first bounding box overlaps the first cache tile. The first tiling unit is further configured to transmit the primitives and the first cache invalidate command to a first screen-space pipeline associated with the first tiling unit for processing. The screen-space pipeline processes the cache invalidate command to invalidate cache lines specified by the cache invalidate command.

20 Claims, 11 Drawing Sheets

(51) Int. Cl.
*G06T 15/40* (2011.01)
*G06T 1/20* (2006.01)
*G06T 1/60* (2006.01)
*G09G 5/395* (2006.01)
*G09G 5/00* (2006.01)
*G06T 15/50* (2011.01)
*G06F 12/08* (2016.01)
*G06F 9/44* (2006.01)
*G06T 15/80* (2011.01)

(56) References Cited

U.S. PATENT DOCUMENTS

| 6,697,063 | B1 | 2/2004 | Zhu et al. |
| 7,102,646 | B1 | 9/2006 | Rubinstein et al. |
| 7,170,515 | B1 | 1/2007 | Zhu et al. |
| 8,085,272 | B1 * | 12/2011 | Molnar et al. ............ 345/505 |
| 8,228,328 | B1 * | 7/2012 | French et al. ............ 345/421 |
| 8,605,102 | B1 | 12/2013 | Purcell et al. |

* cited by examiner

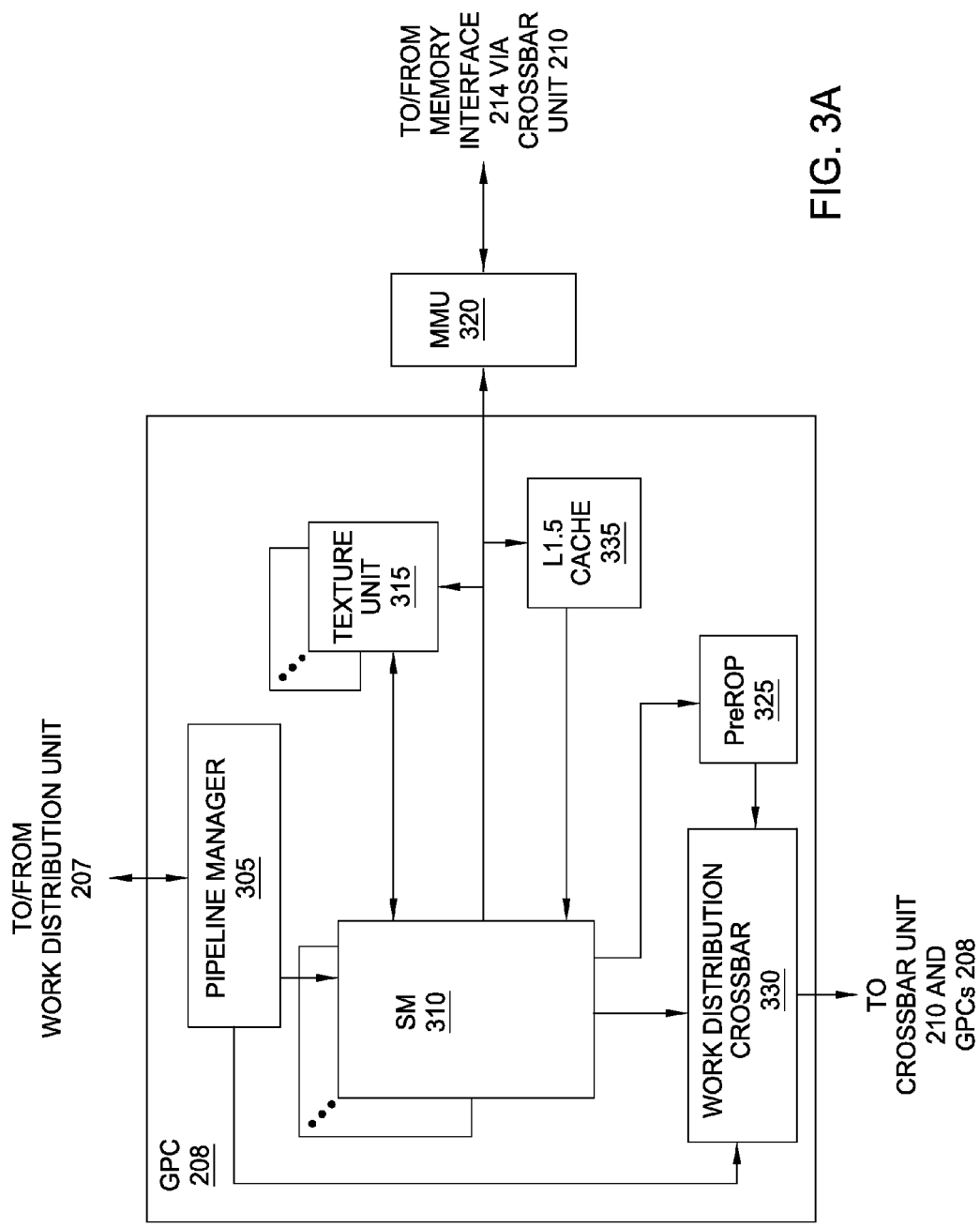

TILED CACHE INVALIDATION

CROSS-REFERENCE TO RELATED APPLICATIONS

This application claims benefit of U.S. provisional patent application Ser. No. 61/719,271, filed Oct. 26, 2012 and titled "An Approach for Tiled Caching." The subject matter of this related application is hereby incorporated herein by reference.

BACKGROUND OF THE INVENTION

1. Field of the Invention

Embodiments of the present invention relate generally to three-dimensional (3D) graphics processing and, more particularly, to tiled cache invalidation.

2. Description of the Related Art

Some graphics subsystems implement a tiling architecture in which a render target is divided into partitions referred to as tiles. Some tiling systems also store data in an on-chip cache memory during rendering, which increases performance and reduces memory bandwidth consumption. For improved performance, multiple processing entities may be provided to process the tiles in parallel.

One challenging aspect of processing data in this manner is managing data flow between the cache memory that stores the cache tiles and an external memory such as a frame buffer. Some intermediate data is only needed during a short processing interval and does not need to be written out from the cache memory to the frame buffer, which would unnecessarily consume memory bandwidth and power. In such situations, preventing cache entries from being written out to the frame buffer through the use of a cache invalidate command reduces the amount of memory bandwidth consumed.

In a graphics subsystem that implements a tiling architecture, cache invalidation is not straightforward. More specifically, when such an architecture reorders received primitives, the architecture must choose a time at which to execute a cache invalidate command that is received along with the primitives. However, if no mechanism exists to account for this discrepancy, or if the wrong time to execute the cache invalidate command is chosen, then there is a risk that the cache invalidate command is executed at a point in time that results in the wrong data being invalidated. Managing this risk is further complicated in a highly parallel tiling architecture that includes multiple processing entities.

As the foregoing illustrates, what is needed in the art is an effective way to invalidate data stored in an on-chip cache memory in a parallel tiled caching architecture.

SUMMARY OF THE INVENTION

One embodiment of the present invention sets forth a graphics subsystem. The graphics subsystem includes a first tiling unit and a crossbar unit. The first tiling unit is associated with a first set of raster tiles. The crossbar unit is configured to transmit a first set of primitives to the first tiling unit. Each primitive included in the first set of primitives overlaps at least one raster tile in the first set of raster tiles. The crossbar unit is also configured to transmit a first cache invalidate command to the first tiling unit. The first cache invalidate command is associated with a first bounding box that overlaps at least one raster tile in the first set of raster tiles. The first tiling unit is configured to determine that a second bounding box associated with one or more primitives included in the first set of primitives overlaps a first cache tile. The first tiling unit is also configured to determine that the first bounding box overlaps the first cache tile. The first tiling unit is further configured to transmit the one or more primitives and the first cache invalidate command to a first screen-space pipeline associated with the first tiling unit for processing.

Another embodiment of the present invention sets forth a computing device. The computing device includes a graphics subsystem. The graphics subsystem includes a first tiling unit and a crossbar unit. The first tiling unit is associated with a first set of raster tiles. The crossbar unit is configured to transmit a first set of primitives to the first tiling unit. Each primitive included in the first set of primitives overlaps at least one raster tile in the first set of raster tiles. The crossbar unit is also configured to transmit a first cache invalidate command to the first tiling unit The first cache invalidate command is associated with a first bounding box that overlaps at least one raster tile in the first set of raster tiles. The first tiling unit is configured to determine that a second bounding box associated with one or more primitives included in the first set of primitives overlaps a first cache tile. The first tiling unit is also configured to determine that the first bounding box overlaps the first cache tile. The first tiling unit is further configured to transmit the one or more primitives and the first cache invalidate command to a first screen-space pipeline associated with the first tiling unit for processing.

Another embodiment of the present invention sets forth a method. The method includes receiving a first set of primitives, wherein each primitive included in the first set of primitives overlaps at least one raster tile in a first set of raster tiles. The method also includes receiving a first cache invalidate command, wherein the first cache invalidate command is associated with a first bounding box that overlaps at least one raster tile in the first set of raster tiles. The method also includes determining that a second bounding box associated with one or more primitives included in the first set of primitives overlaps a first cache tile. The method further includes determining that the first bounding box overlaps the first cache tile. The method also includes transmitting the one or more primitives and the first cache invalidate command to a first screen-space pipeline associated with the first tiling unit for processing.

One advantage of the disclosed techniques is that cache entries storing data that do not need to be written out to memory are invalidated in a graphics subsystem that implements a cache tiling architecture. An additional advantage is that cache entries are invalidated in an architecture that includes multiple parallel processing entities. A further advantage is that by including a cache invalidate command in multiple cache tile batches, the invalidate command can be applied on a per-cache-tile basis, which allows data associated with each cache tile to be invalidated as the data is processed, thereby reducing the amount of memory bandwidth utilization incurred due to writing out the data out to memory.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3A is a block diagram of a general processing cluster included in the parallel processing unit of FIG. 2, according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
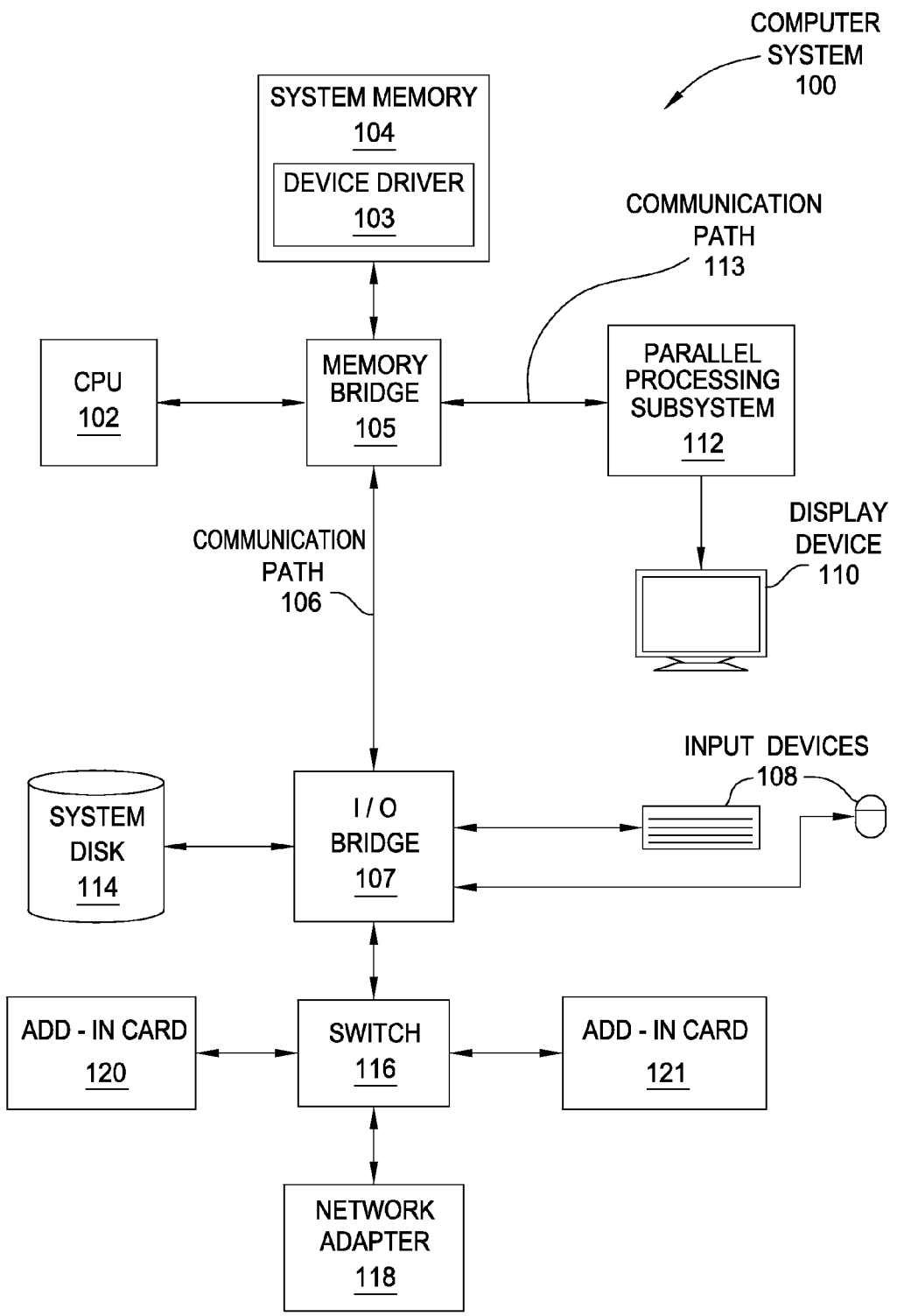
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
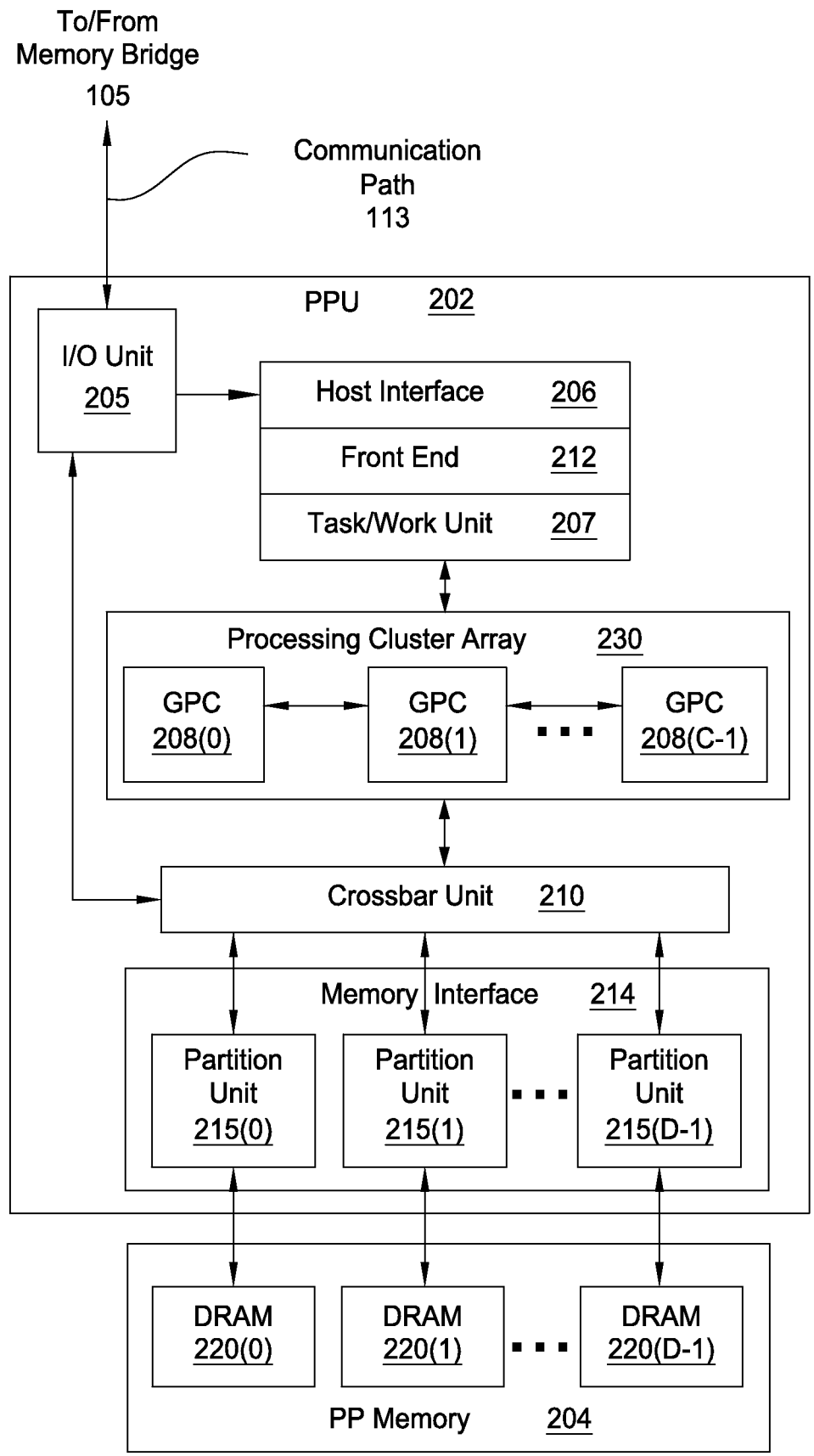
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
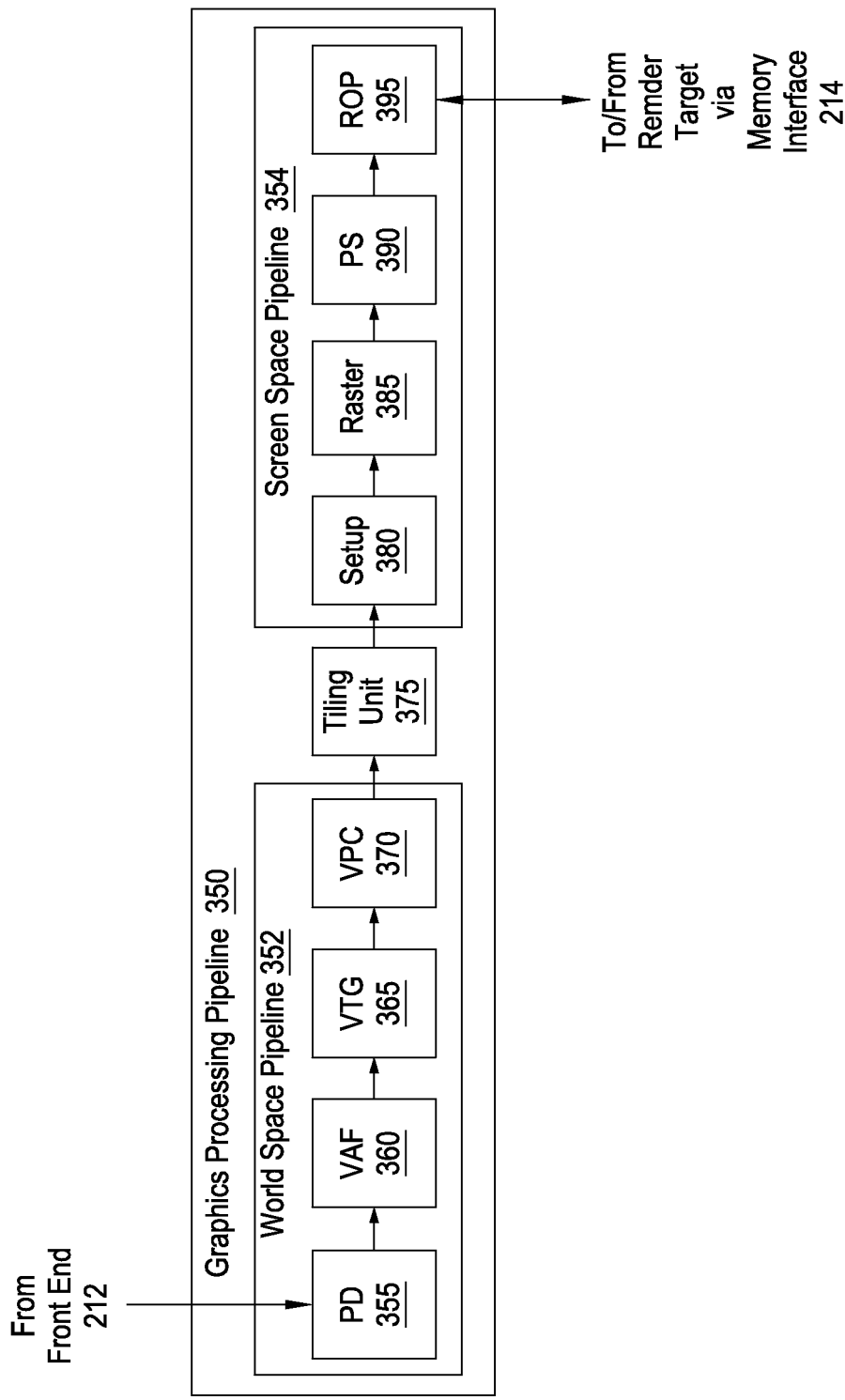
FIG. 3B is a conceptual diagram of a graphics processing pipeline that may be implemented within the parallel processing unit of FIG. 2, according to one embodiment of the present invention.

FIG. 3B is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives, as well as color values, surface normal vectors, and transparency values at each vertex for the graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U, V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Tiled Caching

Figure 4:
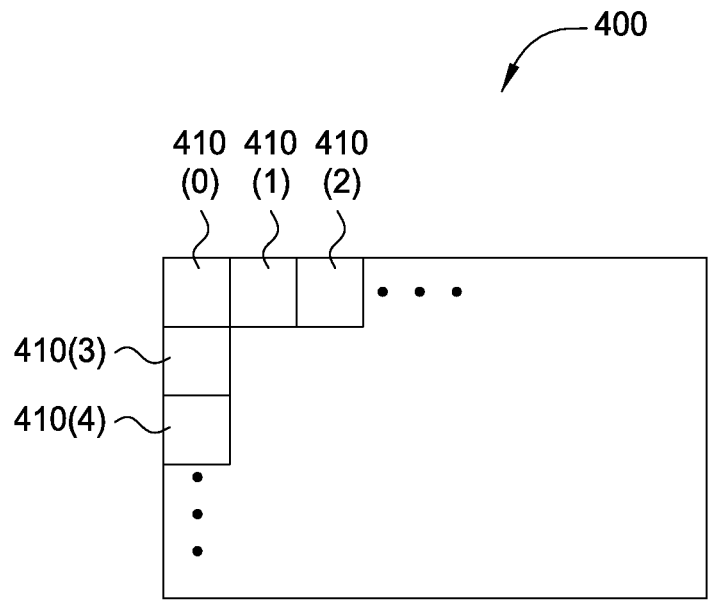
FIG. 4 is a conceptual diagram of a cache tile that the graphics processing pipeline of FIG. 3B may be configured to generate and process, according to one embodiment of the present invention.

FIG. 4 is a conceptual diagram of a cache tile 410(0) that the graphics processing pipeline 350 of FIG. 3B may be configured to generate and process, according to one embodiment of the present invention. As shown, the cache tile 410(0) represents a portion of a screen space 400 and is divided into multiple raster tiles 420.

The screen space 400 represents one or more memory buffers configured to store rendered image data and other data transmitted by functional units within the graphics processing pipeline 350. In some embodiments, the one or more memory buffers may be configured as one or more render targets. The screen space represents a memory buffer configured to store the image rendered by the graphics processing pipeline. The screen space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen space. In operation, once rendering completes, the pixels in the one or more render targets may be transmitted to a display device in order to display the rendered image.

By way of example, a set of render targets for the screen space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen space 400. For clarity, only five cache tiles 410(0)-410(4) are shown in FIG. 4. In some embodiments, cache tiles may have an arbitrary size in X and Y screen space. For example, if a cache tile were to reside in a cache memory that also is used to store other data, then the cache tile could be sized to consume only a specific portion of the cache memory. The size of a cache tile may be based on a number of factors, including, the quantity and configuration of the render targets associated with the screen space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420 (11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

Tiled Cache Invalidation

Figure 6A:
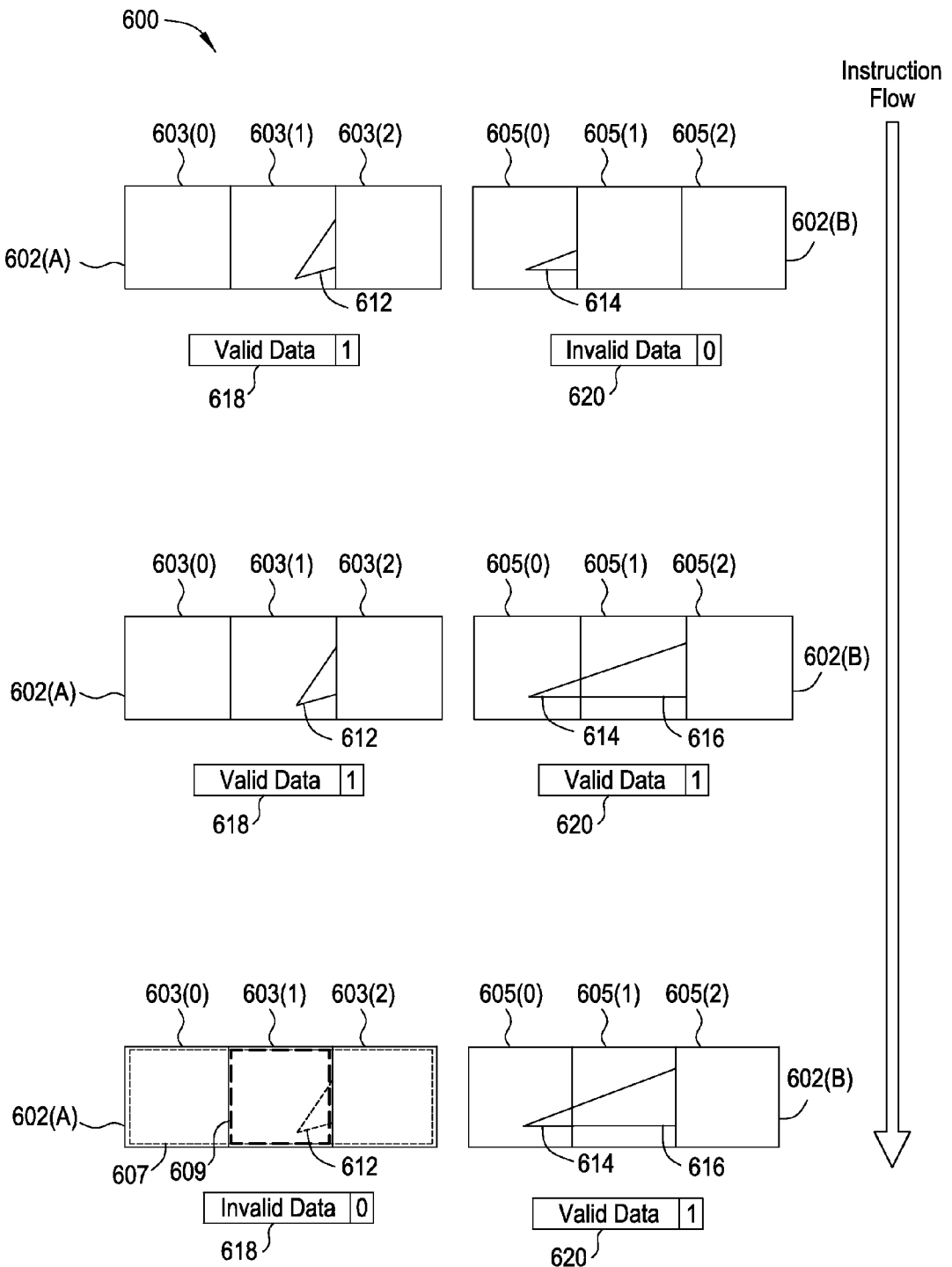
FIG. 6A is a conceptual illustration of a cache invalidate operation executed in the context of two render targets, according to one embodiment of the present invention.
Figure 6B:
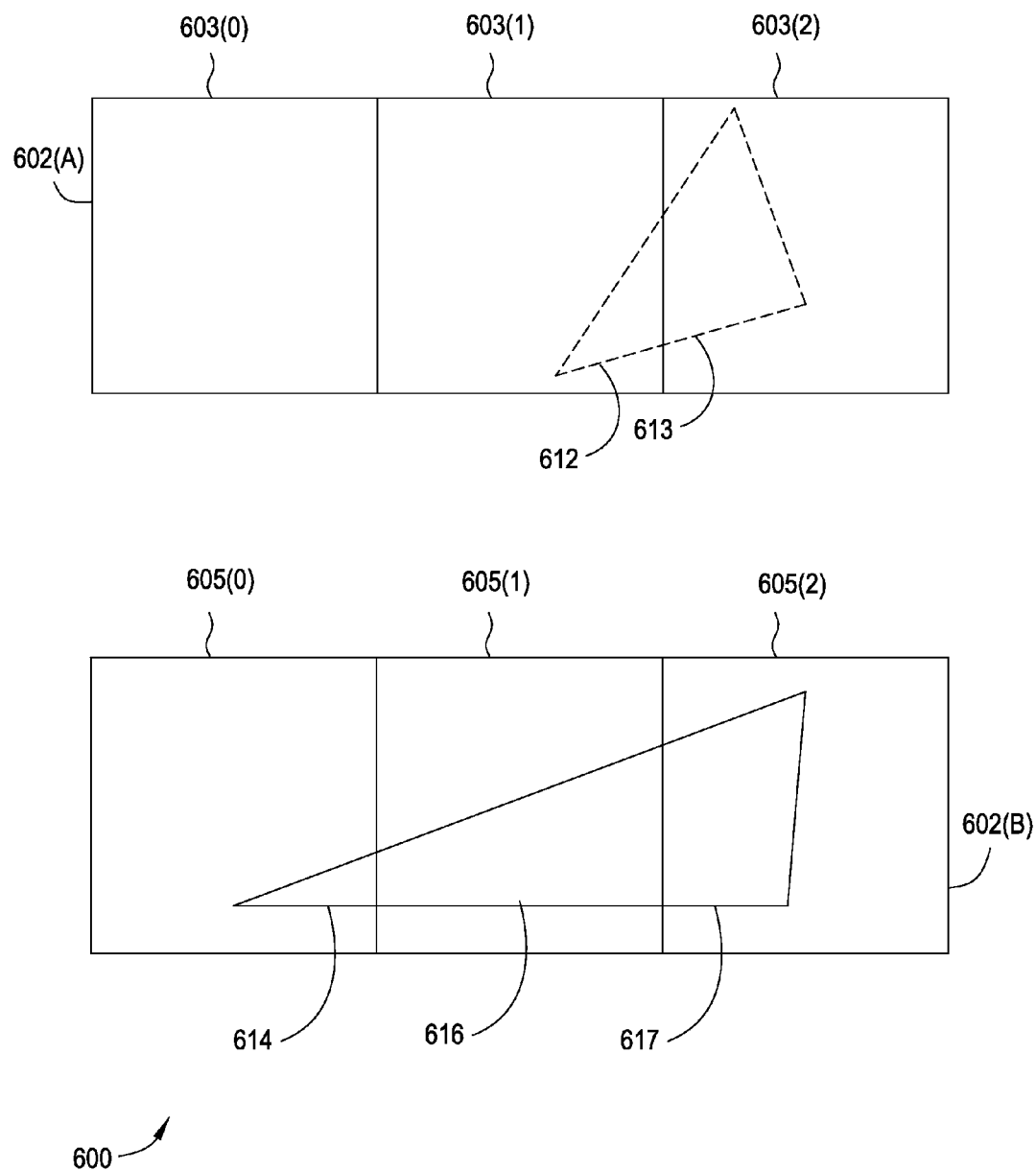
FIG. 6B is a conceptual illustration of the results of the cache invalidate operation of FIG. 6A, according to one embodiment of the present invention.
Figure 7:
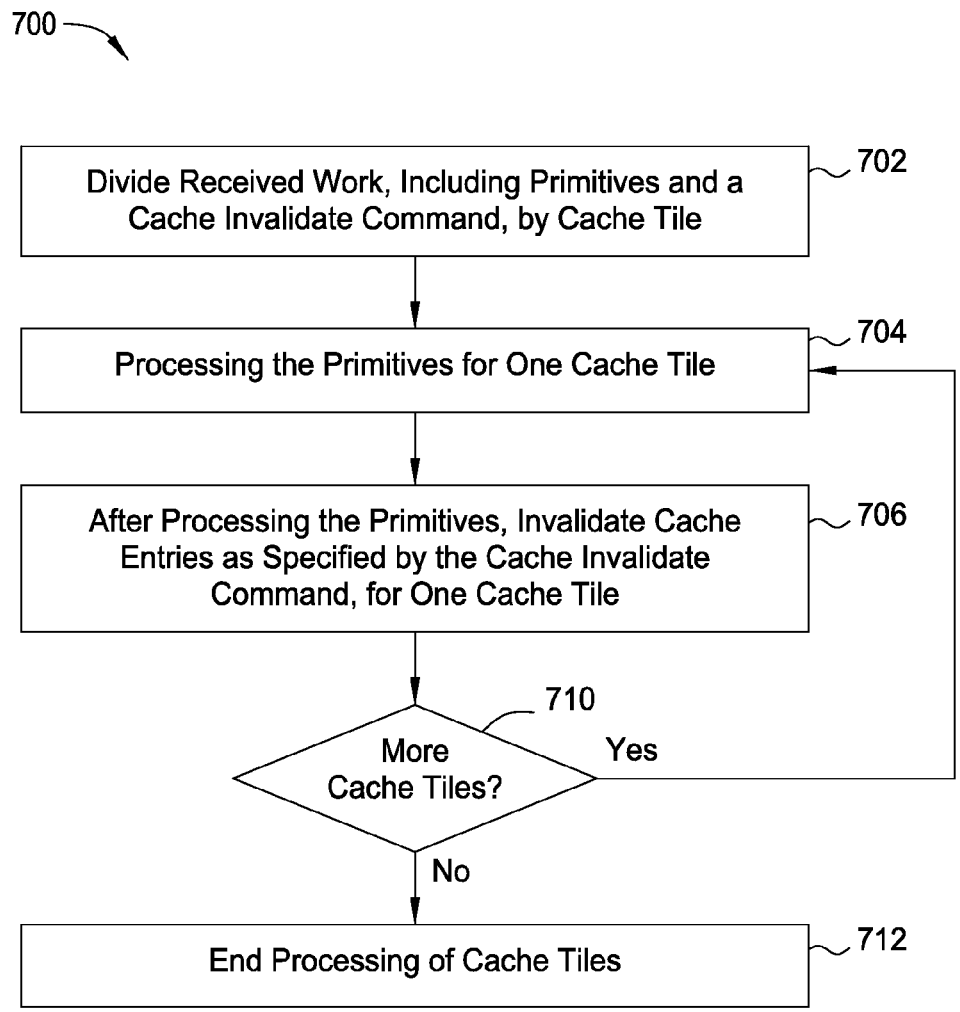
FIG. 7 is a flow diagram of method steps for executing a tiled cache invalidate command, according to one embodiment of the present invention.

FIGS. 5-7 illustrate aspects of a graphics subsystem that implements a cache tiling architecture and that is configured to execute a tiled cache invalidate command. In a cache tiling architecture, such as the architecture described above with respect to FIGS. 3B and 4, work provided to a graphics subsystem that includes one or more graphics pipelines is rearranged based on the cache tile 410 with which the work is associated. This technique allows work associated with a particular subset of data related to a cache tile to be processed together, which reduces the amount of traffic between a cache memory and an external memory (such as main memory or a frame buffer).

In some instances, some of the data generated by the graphics subsystem and stored in the cache memory does not need to be written out to the external memory. In such instances, the graphics subsystem may be configured to invalidate cache entries that store the data that does not need to be written out to external memory. A cache invalidate command is one mechanism by which an application programmer directs the graphics subsystem to invalidate cache entries. When the graphics subsystem processes a cache invalidate command, the cache invalidate command causes the graphics subsystem to invalidate specified cache entries, which prevents the data stored in those cache entries from being written out to the external memory.

In the context of a cache tiling architecture, processing a cache invalidate command with a batch of primitives being rendered is generally not a straightforward operation. The cache invalidate command generally cannot be executed in the order in which the cache invalidate command is received, because some data associated with the batch of primitives may have already been written out from the cache memory. In one example, data associated with a batch of primitives is reordered into a first cache tile batch associated with a first cache tile, a second cache tile batch associated with a second cache tile, and so on. In this context, if a cache invalidate command were executed after the last cache tile batch were processed, then data associated with the first cache tile batch may already have been written out to memory. In such a situation, the cache invalidate command is not as effective as if the data associated with the first cache tile batch were instead invalidated and therefore not written out to memory. FIGS. 5A-7 discussed below illustrate techniques for processing a cache invalidate command so that cache entries are invalidated as expected by an application programmer.

Figure 5A:
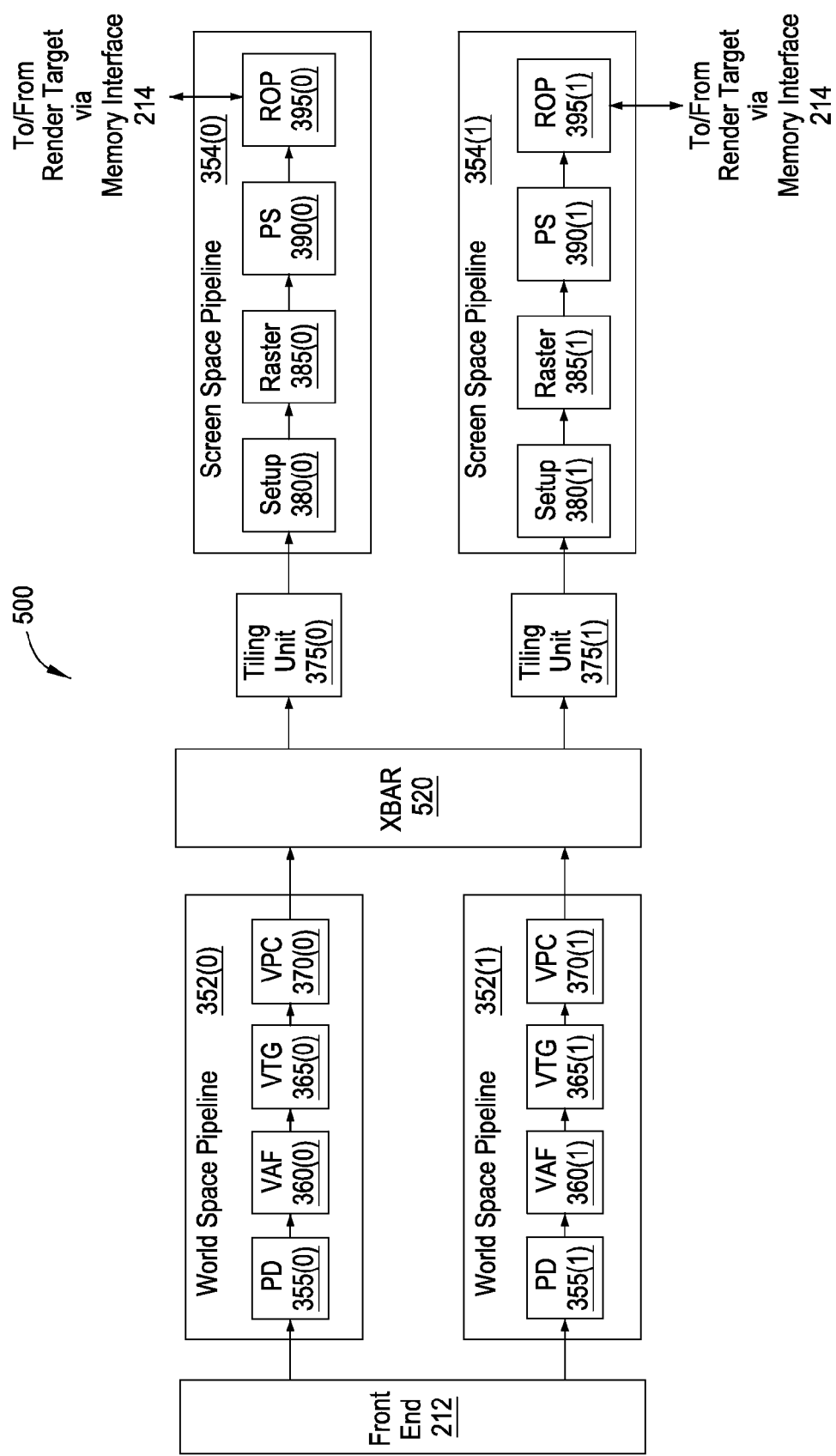
FIG. 5A is a block diagram of a graphics subsystem configured to implement a tiled cache invalidate command, according to one embodiment of the present invention.

FIG. 5A illustrates a graphics subsystem 500 configured to implement a tiled cache invalidate command, according to one embodiment of the present invention. As shown, the graphics subsystem 500 includes a front end unit 212, a first world-space pipeline 352(0), a second world-space pipeline 352(1), a crossbar unit 520 ("XBAR"), a first tiling unit 375(0), a second tiling unit 375(1), a first screen-space pipeline 354(0), and a second screen-space pipeline 354(1).

As shown, the graphics subsystem 500 includes at least two instances of the screen-space pipeline 354 and the world-space pipeline 352, for increased performance. The graphics subsystem 500 also includes a crossbar unit 520 for transmitting work output from the first world-space pipeline 352(0) and the second world-space pipeline 352(1) to the first tiling unit 375(0) and the second tiling unit 375(1). Although depicted in FIG. 5 with two instances of the world-space pipeline 352 and the screen-space pipeline 354, the teachings provided herein apply to graphics pipelines having any number of world-space pipelines 352 and screen-space pipelines 354.

The functionality of the world-space pipelines 352 and the screen-space pipelines 354 are implemented by processing entities such as general processing clusters (GPC) 208, described above. In one embodiment, the first world-space pipeline 352(0) may be implemented in a first GPC 208(0) and the second world-space pipeline 352(1) may be implemented in a second GPC 208(1). As a general matter, each screen-space pipeline 352 may be implemented in a different GPC 208, and in a similar fashion, each world-space pipeline 354 may be implemented in a different GPC 208. Further, a given GPC 208 can implement a world-space pipeline 354 and also a screen-space pipeline 352. For example, the first GPC 208(0) may implement both the first world-space pipeline 352(0) and the first screen-space pipeline 354(0). In embodiments that include more than one screen-space pipeline 354, each screen-space pipeline 354 is associated with a different set of raster tiles 420 for any particular render target.

Each of the pipeline units in the world-space pipelines 352 (i.e., primitive distributor 355, vertex attribute fetch unit 360, vertex, tessellation, geometry processing unit 365, and viewport scale, cull, and clip unit 370) and in the screen-space pipelines 354 (i.e., setup 380, rasterizer 385, pixel shader 390, and ROP 395) depicted in FIG. 5A functions in a similar manner as described above with respect to FIGS. 1-4.

Figure 5B:
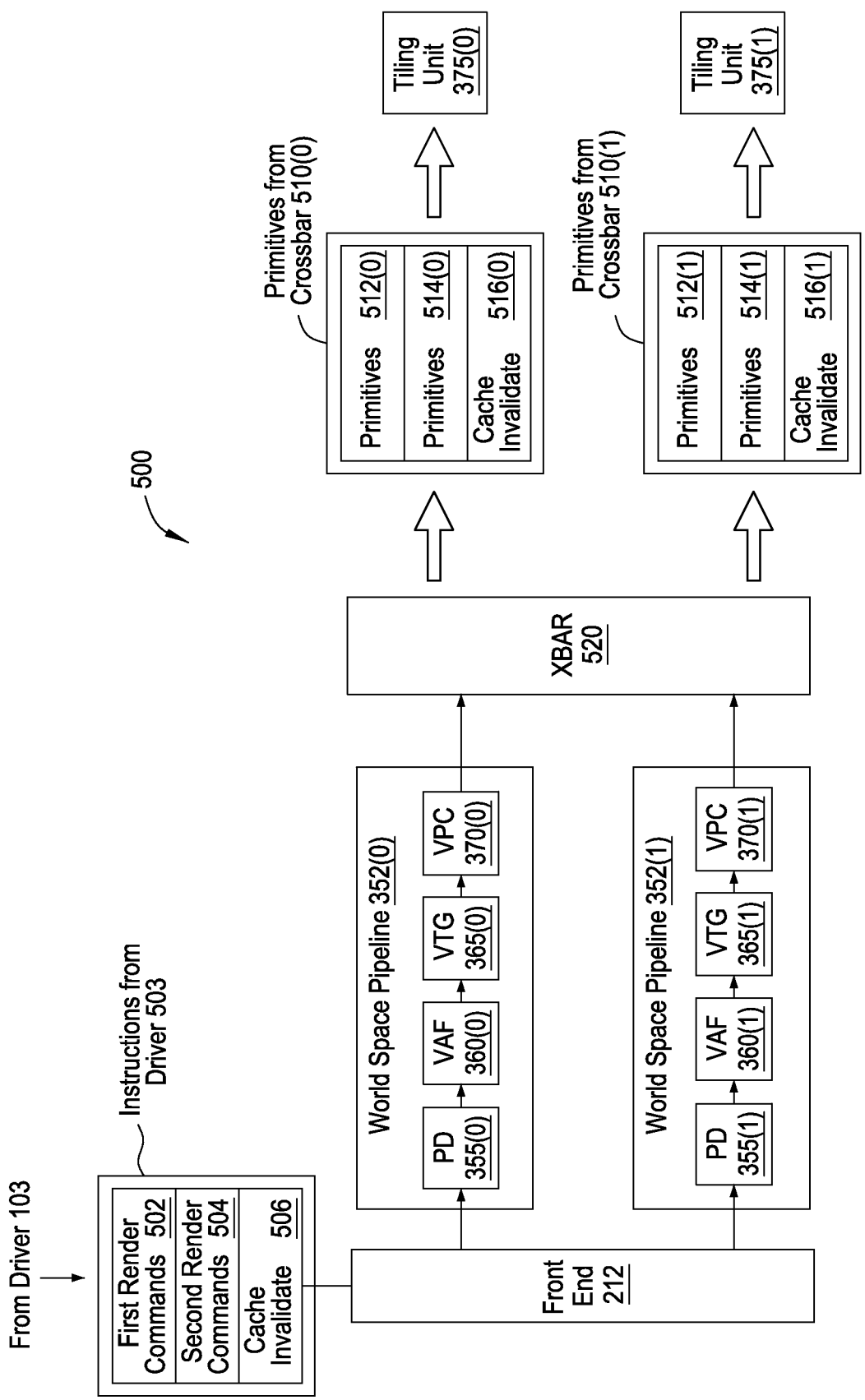
FIG. 5B is a block diagram of a world-space portion of the graphics subsystem of FIG. 5A, according to one embodiment of the present invention.
Figure 5C:
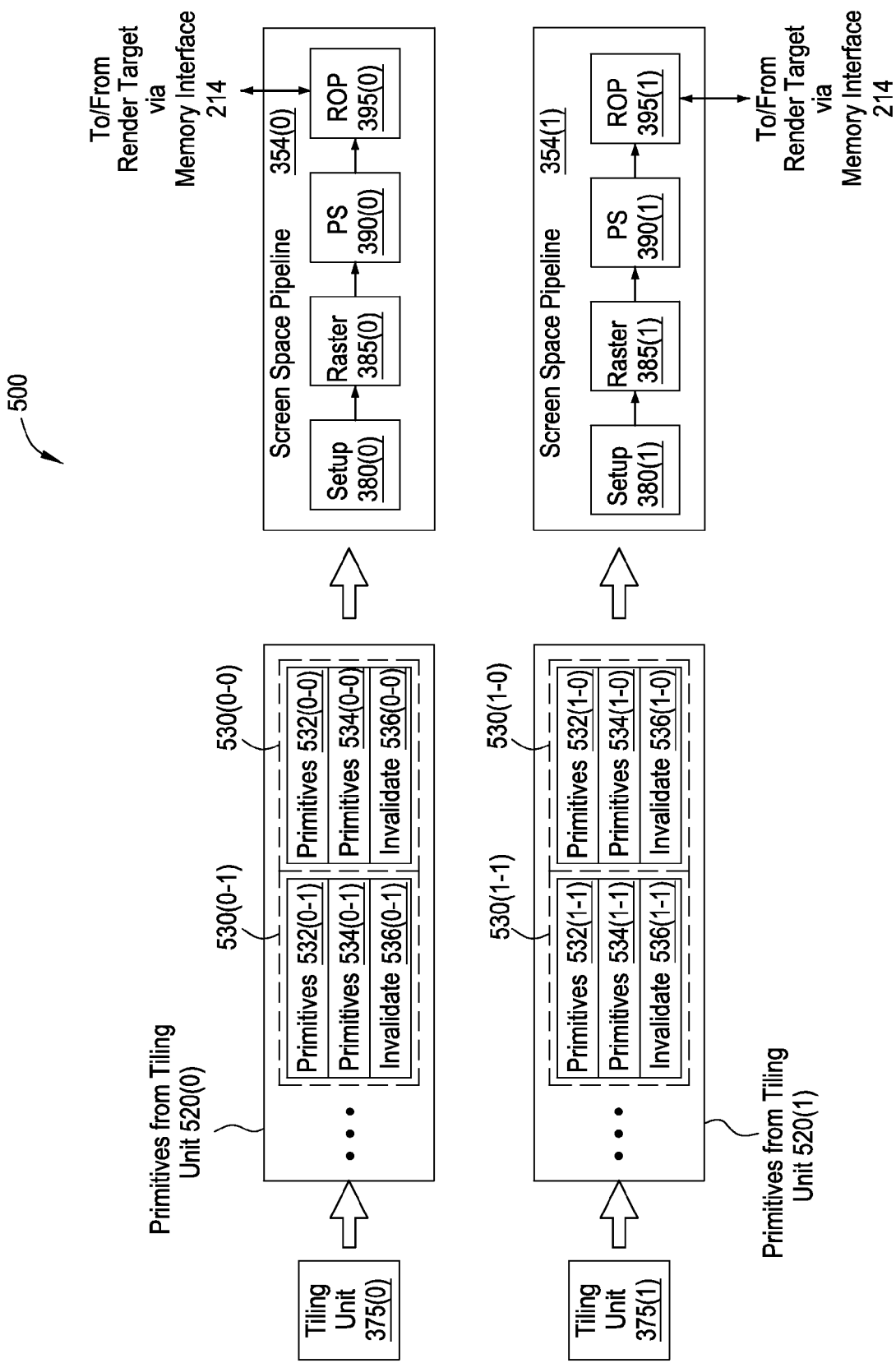
FIG. 5C is a block diagram of a screen-space portion of the graphics subsystem of FIG. 5A, according to one embodiment of the present invention.

Operation of the graphics subsystem 500 is now described with respect to FIGS. 5B and 5C. FIG. 5B illustrates a world-space side of the graphics subsystem 500 that receives commands 503 transmitted by a device driver 103 and processes those commands 503 to generate primitives. FIG. 5C illustrates the screen-space side of the graphics subsystem 500, which processes the primitives and the invalidate command to generate and then invalidate pixel data.

FIG. 5B is a block diagram of a world-space portion of graphics subsystem 500 of FIG. 5A, according to one embodiment of the present invention. As shown, the world-space side of the graphics subsystem 500 includes a front-end unit 212, a first world-space pipeline 352(0), a second world-space pipeline 352(1), a crossbar unit 520, a first tiling unit 375(0), and a second tiling unit 375(1).

A device driver 103 transmits commands 503 to the front end unit 212. The commands 503 are depicted in the order in which the commands 503 are transmitted from the driver 103 and include a first batch of commands 502, a second batch of commands 504, and a cache invalidate command 506. The first batch of commands 502 and second batch of commands 504 include commands for rendering primitives. The cache invalidate command 506 is configured to cause the graphics subsystem 500 to invalidate specified cache entries. Each command in the first batch of commands 502, second batch of commands 504, and cache invalidate command 506 may specify a render target with which the command is associated. A render target is a logical data store that represents a surface on which to draw pixels and perform other graphics operations. Multiple render targets may be specified during rendering operations, as is generally known in the art.

When the front end unit 212 receives the commands 503 from the device driver 103, the front end unit 212 distributes tasks associated with the first render commands 502, the second render commands 504, and the cache invalidate command 506, to the world-space pipelines 352 for processing. In one embodiment, the front end unit 212 assigns tasks to the first world-space pipeline 352(0) and the second world-space pipeline 352(1) in round-robin order. For example, the front end unit 212 may transmit tasks for a first batch of primitives associated with the first render commands 502 to the first world-space pipeline 352(0) and tasks for a second batch of primitives associated with the first render commands 502 to the second world-space pipeline 352(1). The front end unit 212 also transmits tasks associated with the cache invalidate command 506 to the world-space pipelines 352 for processing.

In some embodiments, the cache invalidate command 506 is treated like screen state. Screen state is typically transmitted through the screen-space pipelines 354 in the form of state bundles. Each unit in the screen-space pipeline 354 that receives a state bundle forwards the bundle on to the next unit. In such an embodiment, the front end unit 212 transmits the cache invalidate command 506 to a state circular buffer (not shown) in an L2 cache, for retrieval by the tiling unit 575.

In other embodiments, the cache invalidate command 506 is treated as a primitive by the graphics subsystem 500. Because the cache invalidate command 506 is treated as a primitive by the graphics subsystem 500, as described in further detail below, in embodiments in which the front end unit 212 transmits primitives to the world-space pipelines 352 in round-robin order, the front end unit 212 transmits the cache invalidate command 506 to one of the world-space pipelines 352 in accordance with the round-robin order distribution.

The first world-space pipeline 352(0) and second world-space pipeline 352(1) each process tasks associated with the first batch of commands 502 and tasks associated with the second batch of commands 504, and generate primitives for processing by the first screen-space pipeline 354(0) and the second screen-space pipeline 354(1).

The first world-space pipeline 352(0) and second world-space pipeline 352(1) each include a bounding box generator unit (not shown) that determines to which screen space pipeline—the first screen-space pipeline 354(0) or the second screen-space pipeline 354(1)—each primitive should be transmitted. The bounding box generator unit generates bounding boxes for each primitive, and compares the bounding boxes to raster tiles 420. If a bounding box associated with a primitive overlaps one or more raster tiles associated with a particular screen-space pipeline 354, then the bounding box generator unit determines that the primitive is to be transmitted to that screen-space pipeline 354. Further, if the bounding box generator unit determines that a bounding box associated with a primitive overlaps raster tiles associated with more than one screen-space pipeline, then the bounding box generator unit determines that the primitive is to be transmitted to each such screen-space pipeline 354. The world-space pipelines 352 transmit the primitives to the crossbar unit 520, which transmits the primitives to the corresponding tiling units 375.

In the example workflow illustrated in FIG. 5B, a first set of primitives 510(0) and a second set of primitives 510(1) are depicted. The bounding box generator unit has determined that the primitives in the first set of primitives 510(0) overlap raster tiles associated with the first screen-space pipeline 354(0). Therefore, the crossbar unit 520 transmits the first set of primitives 510(0) to the first tiling unit 375(0). The first set of primitives 510(0) includes a first batch of primitives 512(0) associated with the first render commands 502, a second batch of primitives 514(0) associated with the second render commands 504 and a cache invalidate command 516(0), which is retrieved from the state circular buffer in which the cache invalidate command 516(0) is stored. The bounding box generator unit has also determined that the primitives in the second set of primitives 510(1) overlap raster tiles associated with the second screen-space pipeline 354(1). Therefore, the crossbar unit 520 transmits the second set of primitives 510(1) to the second tiling unit 375(1). The second set of primitives 510(1) includes a first batch of primitives 512(1) associated with the first render commands 502, a second batch of primitives 514(1) associated with the second render commands 504 and a cache invalidate command 516(1), which is retrieved from the state circular buffer in which the cache invalidate command 516(1) is stored.

FIG. 5C is a block diagram of a screen-space portion of graphics subsystem 500 of FIG. 5A, according to one embodiment of the present invention. As shown, the screen-space side of the graphics subsystem 500 includes a first tiling unit 375(0), a second tiling unit 375(1), a first screen-space pipeline 354(0), and a second screen-space pipeline 354(1).

As described above with respect to FIG. 5B, the tiling units 375 receive primitives from the crossbar unit 520. Each tiling unit 375 accepts and stores these primitives until the tiling unit 375 decides to perform a flush operation. Each tiling unit 375 decides to perform a flush operation when one or more resource counters maintained by the tiling units 375 indicates that a resource has exceeded a threshold.

Upon receiving primitives, a tiling unit 375 updates several resource counters associated with the primitives. The resource counters are configured to track the degree of utilization of various resources associated with the primitives received by the tiling units 375. Resources are either global resources or local resources. Global resources are pools of resources that are shared by all screen-space pipelines 354 and world-space pipelines 352. Local resources are resources that not shared between screen-space pipelines 354 or between world-space pipelines 352. Several examples of local and global resources are now provided.

One type of local resource is a primitive storage space for storing primitives in a tiling unit 375. Each tiling unit 375 includes a primitive storage space that is maintained independently of primitive storage space for other tiling units 375. When a tiling unit 375 receives a primitive, some of the primitive storage space is occupied by the primitive. Because only a limited amount of primitive storage space exists for each tiling unit 375, exceeding a threshold amount of storage space in a particular tiling unit 375 causes the tiling unit 375 to perform a flush operation.

One type of global resource is a vertex attribute circular buffer. The vertex attribute circular buffer includes circular buffer entries that include vertex attributes. The vertex attribute circular buffer is available to units in the graphics subsystem 500 for reading vertex attributes associated with primitives. Each circular buffer entry in the vertex attribute circular buffer occupies a variable amount of storage space. Each tiling unit 375 maintains a count of the amount of space occupied by circular buffer entries associated with primitives in the tiling unit 375.

In one embodiment, the vertex attribute circular buffer may be structured as a collection of smaller per-world-space-pipeline circular buffers. Each per-world-space pipeline circular buffer is associated with a different world-space pipeline 352. If memory space associated with any of the per-world-space-pipeline circular buffers exceed a threshold value, then the associated tiling unit performs a flush operation.

Another type of global resource is a pool of constant buffer table indices. At the application-programming-interface level, an application programmer is permitted to associate constants with shader programs. Different shader programs may be associated with different constants. Each constant is a value that may be accessed while performing computations associated with the shader programs. The pool of constant buffer table indices is a global resource by which constants are associated with shader programs.

When a tiling unit 375 performs a flush operation, the tiling unit 375 iterates through all of the cache tiles 410, and for each cache tile 410, generates a cache tile batch that includes primitives that overlap the cache tile 410. Each tiling unit 375 is associated with a different screen-space pipeline 354. The tiling unit 375 transmits these cache tile batches to the screen-space pipeline 354 associated with the tiling unit as the cache tile batches are generated. The tiling unit 375 continues to transmit cache tile batches in this manner for all cache tiles 410 associated with a render target. In one embodiment, the tiling unit 375 determines which primitives overlap a cache tile 410 by comparing a border of the cache tile 410 with bounding boxes associated with the primitives and received from the bounding box unit.

The tiling unit 375 includes the cache invalidate command 516 in each of the cache tile batches for which the cache invalidate command 516 overlaps the cache tile 410 associated with the cache tile batch. In the example depicted in FIG. 5B, the tiling unit 375 places the cache invalidate command 516 after primitives associated with the first render commands 502 and the second render commands 504.

The tiling unit 375 also includes a command to modify a scissor rectangle in each cache tile batch. The scissor rectangle identifies the portion of a render target on which units in the screen-space pipelines 354 act. These units only act on a portion of a render target that is specified by the current scissor rectangle. Transmitting a command to modify the scissor rectangle with each cache tile batch thus causes each unit to act only on a portion of a render target that is associated with the cache tile batch. In other words, the units in the screen-space pipelines 354 act upon only the portion of the render target associated with the current cache tile.

In the example depicted in FIG. 5C, the cache tile batches generated by the first tiling unit 375(0), include cache tile batch 530(0-0) and cache tile batch 530(0-1), that correspond to the primitives 510(0) that overlap raster tiles associated with the first screen-space pipeline 354(0). The cache tile batches generated by the second tiling unit 375(1) include cache tile batch 530(1-0) and cache tile batch 530(1-1), that correspond to the primitives 510(1) that overlap raster tiles associated with the second screen-space pipeline 354(1).

Cache tile batch 530(0-0) includes primitives 532(0-0), primitives 534(0-0), and cache invalidate command 536(0-0). Primitives 532(0-0) include primitives included in primitives 512(0) that are associated with a first set of raster tiles that are associated with the first screen-space pipeline 354(0) and that overlap a first cache tile. Primitives 534(0-0) include primitives included in primitives 514(0) that are associated with a first set of raster tiles that are associated with the first screen-space pipeline 354(0) and that overlap the first cache tile. The invalidate command 536(0-0) is included in cache tile batch 530(0-0) because the invalidate command 516(0) overlaps the first cache tile. A scissor rectangle included in cache tile batch 530(0-0) specifies that the units in the first screen-space pipeline 354(0) act only upon the cache tile associated with cache tile batch 530(0-0).

Cache tile batch 530(0-1) includes primitives 532(0-1), primitives 534(0-1), and cache invalidate command 536(0-1). Primitives 532(0-1) include primitives included in primitives 512(0) that are associated with a first set of raster tiles that are associated with the first screen-space pipeline 354(0) and that overlap a first cache tile. Primitives 534(0-1) include primitives included in primitives 514(0) that are associated with a first set of raster tiles that are associated with the first screen-space pipeline 354(0) and that overlap the first cache tile. The invalidate command 536(0-1) is included in cache tile batch 530(0-1) because the invalidate command 516(0) overlaps the first cache tile. A scissor rectangle included in cache tile batch 530(0-1) specifies that the units in the first screen-space pipeline 354(0) act only upon the cache tile associated with cache tile batch 530(0-1).

Cache tile batch 530(1-0) includes primitives 532(1-0), primitives 534(1-0), and cache invalidate command 536(1-0). Primitives 532(1-0) include primitives included in primitives 512(0) that are associated with a first set of raster tiles that are associated with the first screen-space pipeline 354(0) and that overlap a first cache tile. Primitives 534(1-0) include primitives included in primitives 514(0) that are associated with a first set of raster tiles that are associated with the first screen-space pipeline 354(0) and that overlap the first cache tile. The invalidate command 536(1-0) is included in cache tile batch 530(1-0) because the invalidate command 516(0) overlaps the first cache tile. A scissor rectangle included in cache tile batch 530(1-0) specifies that the units in the second screen-space pipeline 354(1) act only upon the cache tile associated with cache tile batch 530(1-0).

Cache tile batch 530(1-1) includes primitives 532(1-1), primitives 534(1-1), and cache invalidate command 536(1-1). Primitives 532(1-1) include primitives included in primitives 512(0) that are associated with a first set of raster tiles that are associated with the first screen-space pipeline 354(0) and that overlap a first cache tile. Primitives 534(1-1) include primitives included in primitives 514(0) that are associated with a first set of raster tiles that are associated with the first screen-space pipeline 354(0) and that overlap the first cache tile. The invalidate command 536(1-1) is included in cache tile batch 530(1-1) because the invalidate command 516(0) overlaps the first cache tile. A scissor rectangle included in cache tile batch 530(1-1) specifies that the units in the second screen-space pipeline 354(1) act only upon the cache tile associated with cache tile batch 530(1-1).

The tiling unit 375 transmits the primitives in the cache tile batches 530 to the respective screen-space pipelines 354, which process the primitives as described above with respect to FIGS. 1-4. The screen-space pipelines 354 treat the cache invalidate commands 536 in a similar manner as with other primitives. More specifically, setup 380 calculates edge equations, raster 385 calculates coverage data for the cache invalidate commands 536, and the raster operations unit 395 transmits instructions to the cache memory to invalidate cache lines specified by the cache invalidate commands 536. The pixel shaders 390 are bypassed for the cache invalidate commands 536 because the pixel shaders 390 do not need to perform any operations for the cache invalidate operation. More specifically, no color values related to the pixel shader need to be calculated, as the cache invalidate command has only one pixel value, which is a special value configured to cause a valid bit associated with specified cache lines to be set to 0.

FIG. 6A is a conceptual illustration of a cache invalidate operation 600 executed in the context of two render targets, according to one embodiment of the present invention. As shown, the illustration of the cache invalidate operation 600 depicts a first render target 602(A) and a second render target 602(B). The direction of instruction flow is indicated with the arrow on the right side pointing down.

First render target 602(A) includes first cache tile 603(0), second cache tile 603(1), and third cache tile 603(2). Second render target includes first cache tile 605(0), second cache tile 605(1), and third cache tile 605(2). The first cache tile 603(0) is logically associated with the first cache tile 605(0). This means that the portion of the first render target 602(A) that is associated with the first cache tile 603(0) is logically equivalent to the portion of the second render target 602(B) that is associated with the first cache tile 605(0). This could be the case when, for example, the first render target 602(A) represents certain aspects of a scene, such as z-data, and the second render target 602(B) represents color values for the same scene. FIG. 6A illustrates a rendering operation in which operations associated with first cache tile 605(0) have already completed. Thus, a portion 614 of a primitive in first cache tile 605(0) has already been drawn in the second render target 602(B).

In the first row depicted, portion 612 of a primitive in the first render target 602(A) and overlapping the second cache tile 603(1) has been processed and drawn to the first render target 602(A). No primitives have yet been drawn to the second render target 602(B) for the second cache tile 605(1). The cache entry 618 associated with the portion 612 includes validate data, indicated by a 1 in the valid bit. Because nothing has been drawn to the second cache tile 605(1) in the second render target 602(B), the cache entry 620 associated with the second cache tile 605(1) indicates invalid data, with a valid bit of 0.

In the second row depicted, portion 616 of a primitive is drawn to second render target 602(B) in the second cache tile 605(1). The cache entry 618 associated with the first portion 612 is still indicated as valid, with a valid bit of 1. The cache entry 620 associated with the portion 616 indicates that the cache entry associated with the portion 616 is valid.

In the third row depicted, a cache invalidate command is executed. The cache invalidate command specifies a bounding box 607, and a scissor rectangle 609 is set. The bounding box 607 is the same size and shape as the render target 602(A). The scissor rectangle 609 is the same size and shape as the second cache tile 603(1). In the third row, portion 612 of the primitive is invalidated. The cache invalidate command acts on the intersection of the bounding box 607 and the scissor rectangle 609. Thus, the cache invalidate command invalidates data within cache tile 603(1). Therefore, the cache entry 618 corresponding to portion 612 is invalidated, and is depicted as indicating invalid data, with a valid bit of 0. Because no invalidate operation has occurred in the second render target 602(B), the cache entry 620 associated with portion 616 is still validate, as indicated with a valid bit of 1.

FIG. 6B is a conceptual illustration of the results of the cache invalidate operation of FIG. 6A, according to one embodiment of the present invention. As shown, the illustration of the cache invalidate operation 650 depicts a first render target 602(A) and a second render target 602(B).

First render target 602(A) includes portion 612 of a primitive and portion 613 of a primitive. Portion 612 overlaps cache tile 603(1) on first render target 602(A) and portion 613 overlaps cache tile 603(2) on first render target 602(A). The data associated with portion 612 and portion 613 has already been invalidated and thus has not been written out to memory.

Second render target 602(B) includes portion 614, portion 616, and portion 617 of a primitive that has been drawn. Portion 614 overlaps cache tile 605(0) on second render target 602(B). Portion 616 overlaps cache tile 605(1) on second render target 602(B). Portion 617 overlaps cache tile 605(2) on second render target 602(B). The cache entries associated with the second render target 602(B) has not been invalidated.

FIG. 7 is a flow diagram of method steps for processing a tiled cache invalidate command, according to one embodiment of the present invention. Although the method steps are described in conjunction with FIGS. 1-6B, persons skilled in the art will understand that any system configured to perform the method steps, in any order, falls within the scope of the present invention.

As shown, a method 700 begins in step 702, where a tiling unit 375 receives work from a world-space pipeline 352, including primitives and a cache invalidate command. The tiling unit 375 divides the received work into cache tile batches. The cache tile batches include one or more primitives from the primitives received by the tiling unit 375, and include a cache invalidate command if the cache invalidate is configured to overlap the cache tile associated with the cache tile batch. The tiling unit 375 transmits this divided work to the screen-space pipeline 354 in cache tile order. In step 704, the screen-space pipeline 354 processes the primitives associated with one cache tile, as received from the tiling unit 375. In step 706, the screen-space pipeline 354 processes the cache invalidate command for a cache tile. The cache invalidate command is configured to cause the ROP unit 395 to invalidate cache entries specified by the cache invalidate command. More specifically, the ROP unit 395 invalidates cache entries associated with a portion of a render target that comprises the intersection of a scissor rectangle and a bounding box associated with the cache invalidate command. In step 710, the screen-space pipeline 354 determines whether there are more cache tiles and if there are, the method returns to step 704, where the screen space pipeline 354 processes primitives associated with the next cache tile. If, in step 710, the screen-space pipeline 354 determines that there are no more cache tiles to process, then in step 712, the screen-space pipeline 354 ends processing of the cache tiles. At this point, the tiling unit 375 may be accepting new primitives, and can perform a flush operation as described above with respect to FIGS. 5A-5C.

In sum, a driver provides data and a cache invalidate command to a graphics subsystem including multiple screen-space pipelines and world-space pipelines. The world-space pipelines generate primitives based on data transmitted by the driver and determine which screen-space pipelines the primitives are to be transmitted to, based on which raster tiles the primitives overlap. For each screen-space pipeline, a tiling unit associated with the screen-space pipeline receives the primitives and the cache invalidate command, from the world-space section of the graphics pipeline. The cache invalidate command is transmitted to each screen-space pipeline. Each tiling unit iterates through a plurality of cache tiles, and for each cache tile, compares bounding boxes associated with primitives with the cache tile. For each bounding box that overlaps the cache tile, the tiling unit transmits the primitives associated with the bounding box to a screen-space pipeline that is associated with the tiling unit. The tiling unit also compares a bounding box associated with the cache invalidate command to the cache tile, and if the bounding box overlaps the cache tile, the tiling unit transmits the cache invalidate command to the screen-space pipeline that is associated with the tiling unit. For each cache tile, the collection of primitives and cache invalidate command that is associated with the cache tile is referred to as a cache tile batch.

The screen-space pipeline receives the cache tile batches and processes each one in turn. More specifically, for each cache tile batch, the screen-space pipeline renders the primitives included in that cache tile batch, and if the cache tile batch includes a tiled cache invalidate command, the screen space section of the pipeline invalidates cache lines as specified by the tiled cache invalidate commands. If the tiled cache invalidate command specifies a scissor rectangle and a bounding box, then the screen-space pipeline invalidates cache lines associated with the intersection of the scissor rectangle and the bounding box.

One advantage of the above described techniques is that cache entries storing data that do not need to be written out to memory are invalidated in a graphics subsystem that implements a cache tiling architecture. An additional advantage is that cache entries are invalidated in an architecture that includes multiple parallel processing entities. A further advantage is that by including a cache invalidate command in multiple cache tile batches, the invalidate command can be applied on a per-cache-tile basis, which allows data associated with each cache tile to be invalidated as the data is processed, thereby reducing the amount of memory bandwidth utilization incurred due to writing out the data out to memory.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:
1. A graphics subsystem, comprising:
a first tiling unit; and
a crossbar unit configured to:
transmit a first set of primitives to the first tiling unit, and
transmit a first cache invalidate command to the first tiling unit, wherein the first cache invalidate command is associated with a first bounding box, wherein the first tiling unit is configured to:
  determine that a second bounding box associated with a first primitive included in the first set of primitives overlaps a first cache tile,
  determine that the first bounding box overlaps the first cache tile, and
  transmit the first primitive and the first cache invalidate command to a first screen-space pipeline associated with the first tiling unit for processing.

2. The graphics subsystem of claim 1, further comprising:
a first raster operations unit included in the first screen-space pipeline and configured to:
  receive the first cache invalidate command, and
  in response to receiving the first cache invalidate command, invalidate a first cache entry that is associated with the first cache invalidate command.

3. The graphics subsystem of claim 2, wherein the first raster operations unit is further configured to receive a first scissor rectangle that is associated with the first cache invalidate command and is configured to indicate a first subdivision of a first render target with which the cache invalidate command is associated.

4. The graphics subsystem of claim 3, wherein the first cache tile is associated with a second subdivision of the first render target.

5. The graphics subsystem of claim 4, wherein:
the first scissor rectangle is further associated with a first subdivision of a second render target; and
the first cache tile is further associated with a second subdivision of the second render target.

6. The graphics subsystem of claim 1, further comprising:
a second tiling,
wherein the crossbar unit is further configured to:
  transmit a second set of primitives to the second tiling unit, and
  transmit a second cache invalidate command to the second tiling unit, wherein the second cache invalidate command is associated with a third bounding box, and
wherein the second tiling unit is configured to:
  determine that a fourth bounding box associated with a second primitive included in the second set of primitives overlaps the first cache tile,
  determine that the third bounding box overlaps the first cache tile, and
  transmit the second primitive and the second cache invalidate command to a second screen-space pipeline associated with the second tiling unit for processing.

7. The graphics subsystem of claim 6, wherein:
the first tiling unit is further configured to:
  determine that a fifth bounding box associated with a third primitive included in the first set of primitives overlaps a second cache tile, and
  transmit the third primitive to the first screen-space pipeline for processing, and
the second tiling unit is further configured to:
  determine that a sixth bounding box associated with a fourth primitive included in the second set of primitives overlaps the second cache tile, and
  transmit the fourth primitive to the second screen-space pipeline for processing.

8. The graphics subsystem of claim 7, wherein:
the crossbar unit is further configured to:
  transmit a third set of primitives to the first tiling unit before transmitting the first cache invalidate command to the first tiling unit, and
  transmit a fourth set of primitives to the second tiling unit before transmitting the second cache invalidate command to the second tiling unit;
the first tiling unit is further configured to:
  determine that a seventh bounding box associated with a fifth primitive included in the third set of primitives overlaps a first cache tile, and
  transmit the fifth primitive to the first screen-space pipeline for processing, and
the second tiling unit is further configured to:
  determine that an eighth bounding box associated with a sixth primitive included in the fourth set of primitives overlaps a first cache tile, and
  transmit the sixth primitive to the second screen-space pipeline for processing.

9. The graphics subsystem of claim 8, further comprising:
a second raster operations unit, configured to:
  write color data associated with the second set of primitives and with the first cache tile to a cache memory,
  write color data associated with the fourth set of primitives and with the first cache tile to a cache memory, and
  invalidate the color data associated with the second set of primitives after receiving the second cache invalidate command, and
wherein the first raster operations unit is further configured to:
  write color data associated with the first set of primitives and with the first cache tile to a cache memory,
  write color data associated with the third set of primitives and with the first cache tile to a cache memory, and
  invalidate the color data associated with the first set of primitives after receiving the first cache invalidate command.

10. A computing device, comprising:
a graphics subsystem, comprising:
  a first tiling unit; and
  a crossbar unit configured to:
    transmit a first set of primitives to the first tiling unit, and
    transmit a first cache invalidate command to the first tiling unit, wherein the first cache invalidate command is associated with a first bounding box,
  wherein the first tiling unit is configured to:
    determine that a second bounding box associated with a first primitive included in the first set of primitives overlaps a first cache tile,
    determine that the first bounding box overlaps the first cache tile, and
    transmit the first primitive and the first cache invalidate command to a first screen-space pipeline associated with the first tiling unit for processing.

11. The computing device of claim 10, further comprising:
a first raster operations unit included in the first screen-space pipeline and configured to:
  receive the cache invalidate command, and
  in response to receiving the first cache invalidate command, invalidate a first cache entry that is associated with the first cache invalidate command.

12. The computing device of claim 11, wherein the first raster operations unit is further configured to receive a first scissor rectangle that is associated with the first cache invalidate command and is configured to indicate a first subdivision of a first render target with which the cache invalidate command is associated.

13. The computing device of claim 12, wherein the first cache tile is associated with a second subdivision of the first render target.

14. The computing device of claim 13, wherein:
the first scissor rectangle is further associated with a first subdivision of a second render target; and
the first cache tile is further associated with a second subdivision of the second render target.

15. The computing device of claim 10, further comprising:
a second tiling unit included in the graphics subsystem,
wherein the crossbar unit is further configured to:
transmit a second set of primitives to the second tiling unit, and
transmit a second cache invalidate command to the second tiling unit, wherein the second cache invalidate command is associated with a third bounding box, and
wherein the second tiling unit is configured to:
determine that a fourth bounding box associated with a second primitive included in the second set of primitives overlaps the first cache tile,
determine that the third bounding box overlaps the first cache tile, and
transmit the second primitive and the second cache invalidate command to a second screen-space pipeline associated with the second tiling unit for processing.

16. The computing device of claim 15, wherein:
the first tiling unit is further configured to:
determine that a fifth bounding box associated with a third primitive included in the first set of primitives overlaps a second cache tile, and
transmit the third primitive to the first screen-space pipeline for processing, and
the second tiling unit is further configured to:
determine that a sixth bounding box associated with a fourth primitive included in the second set of primitives overlaps the second cache tile, and
transmit the fourth primitive to the second screen-space pipeline for processing.

17. The computing device of claim 16, wherein:
the crossbar unit is further configured to:
transmit a third set of primitives to the first tiling unit before transmitting the first cache invalidate command to the first tiling unit, and
transmit a fourth set of primitives to the second tiling unit before transmitting the second cache invalidate command to the second tiling unit;
the first tiling unit is further configured to:
determine that a seventh bounding box associated with a fifth primitive included in the third set of primitives overlaps a first cache tile, and
transmit the fifth primitive to the first screen-space pipeline for processing, and
the second tiling unit is further configured to:
determine that an eighth bounding box associated with a sixth primitive included in the fourth set of primitives overlaps a first cache tile, and
transmit the sixth primitive to the second screen-space pipeline for processing.

18. The computing device of claim 17, further comprising:
a second raster operations unit included in the graphics subsystem and, configured to:
write color data associated with the second set of primitives and with the first cache tile to a cache memory,
write color data associated with the fourth set of primitives and with the first cache tile to a cache memory, and
invalidate the color data associated with the second set of primitives after receiving the second cache invalidate command, and
wherein the first raster operations unit is further configured to:
write color data associated with the first set of primitives and with the first cache tile to a cache memory,
write color data associated with the third set of primitives and with the first cache tile to a cache memory, and
invalidate the color data associated with the first set of primitives after receiving the first cache invalidate command.

19. A method for invalidating cache entries, comprising:
receiving a first cache invalidate command, wherein the first cache invalidate command is associated with a first bounding box;
determining that a second bounding box associated with one or more primitives included overlaps a first cache tile;
determining that the first bounding box overlaps the first cache tile; and
transmitting the one or more primitives and the first cache invalidate command to a first screen-space pipeline for processing.

20. The method of claim 19, wherein the cache invalidate command is configured to cause a first raster operations unit to invalidate a first cache entry that is associated with the first cache invalidate command.

* * * * *